UNITED STATES PATENT OFFICE.

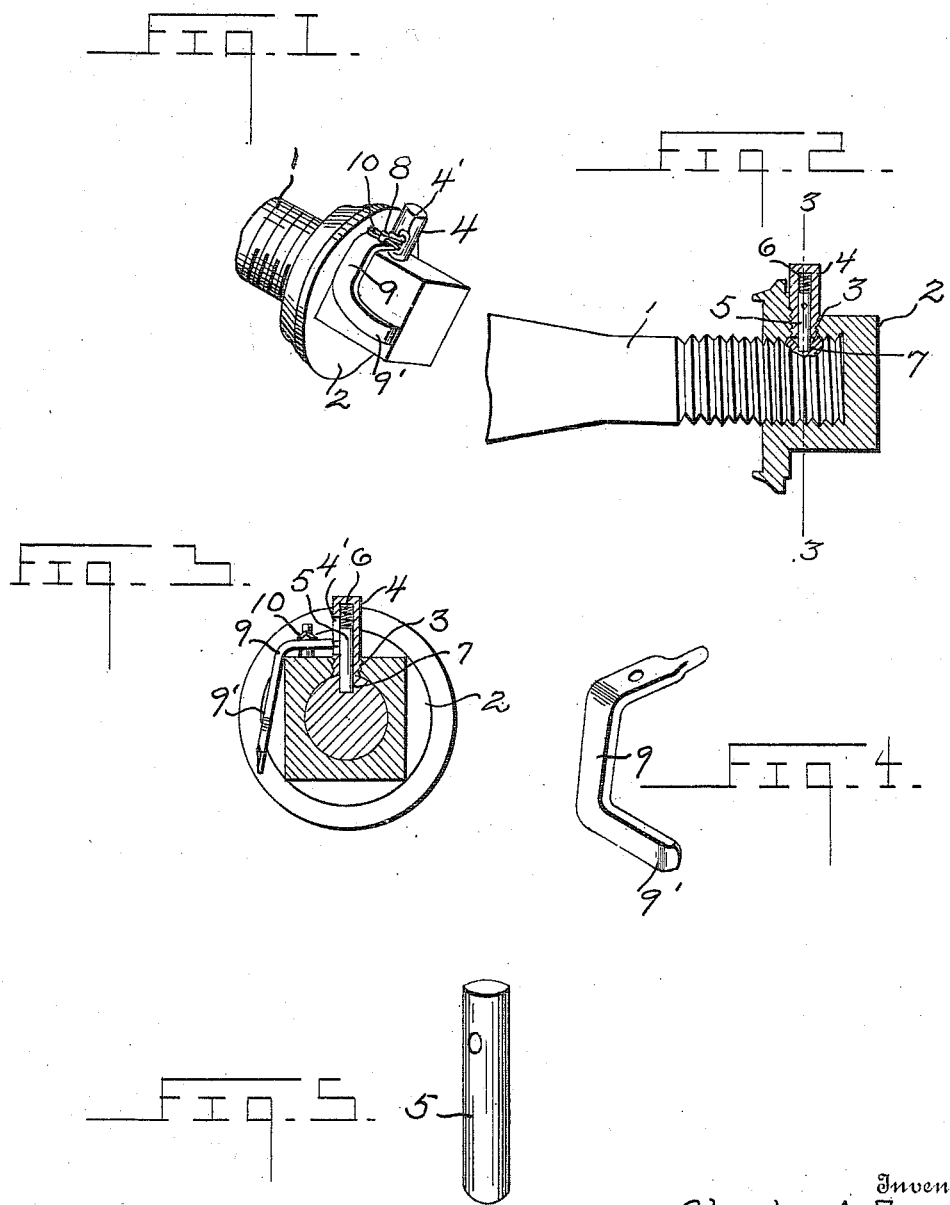

CHARLES A. EVANS, OF CIRCLEVILLE, OHIO.

NUT-LOCK.

983,036.

Specification of Letters Patent. Patented Jan. 31, 1911.

Application filed July 7, 1909. Serial No. 506,271.

*To all whom it may concern:*

Be it known that I, CHARLES A. EVANS, a citizen of the United States, residing at Circleville, in the county of Pickaway and State of Ohio, have invented certain new and useful Improvements in Nut-Locks, of which the following is a specification.

This invention relates to improvements in nut locks, and has for its object to provide an extremely simple and inexpensive construction whereby the nut may be securely locked upon the bolt to prevent the same from threading outwardly and thereby loosening the bolt.

A further object is to provide a spring-pressed pin mounted in a tubular extension which communicates with the bore of the nut, and is adapted to be received in a socket in the bolt.

A further object is to provide new and novel means by which the pin may be released from engagement in the bolt so that the nut can be removed therefrom.

With these and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

In the drawings forming a part of this specification, and in which like numerals of reference indicate similar parts in the several views, Figure 1 is a perspective view of my improved nut lock. Fig. 2 is a central longitudinal view thereof. Fig. 3 is a section taken on the line 3—3 of Fig. 2. Fig. 4 is a detail perspective view of the releasing bar, and Fig. 5 is a similar view of the locking pin.

Referring to the drawings, 1 indicates the bolt and 2 the nut which is threaded thereon. This nut may be of any desired form and has a radial opening 3 extending therethrough and communicating with the bore of the same. A tubular extension 4 is threaded into the bore 3, and has disposed therein the locking pin 5. A coiled spring 6 is located between the rear end of the pin 5 and the outer end of the tubular extension 4, which is adjusted to normally retain the pin in a socket 7 formed in the periphery of the bolt 1.

A stud is secured to the nut as at 8 and has loosely mounted thereon the releasing bar 9. The end of this bar is reduced in width and extends through a slot 4' in the side of the extension 4, and is secured in the locking pin 5. The releasing lever 9 is disposed on one side of the nut and the end thereof is extended longitudinally of the nut as at 9' to provide a suitable finger piece by means of which the bar may be operated to reciprocate the locking pin when it is desired to remove the nut from the bolt. An opening is provided in the upper end of the stud 8 and is adapted to receive a cotter pin 10 by means of which the releasing lever is secured thereon. As the lever 9 is loosely mounted upon the stud 8, it may be oscillated transversely of the nut by pressing inwardly upon the longitudinal extension 9'. Thus the inner end of the lever which is secured to the locking pin will raise the pin, against the tension of the spring 6, from the socket 7 formed in the bolt. The socket 7 is, of course, of sufficient depth to prevent the locking pin being forced therefrom, should the bolt or nut be turned. The nut may, however, be instantly removed by simply grasping the same and thrusting the lower end of the releasing bar 9 against the nut.

From the foregoing it will be seen that I have provided a very efficient lock nut which is extremely simple in construction and which may be securely locked upon the bolt without the use of a wrench or tools of any kind. The various parts may be readily made and quickly assembled upon the nut, and are so arranged and of such proportions that they will not interfere with the proper manipulation of the nut or render the same unwieldy. Should it become necessary, however, a wrench may be readily applied to the nut, the application of which will force the operating bar inwardly against the side of the nut and remove the locking pin 5 from engagement in the socket of the bolt. The nut may then be readily turned upon the bolt, the beveled end portion 11 of the bar 9 facilitating the presentation of the wrench over the nut.

While my invention is applicable to a large number of uses, it is more particularly designed and adapted for use upon the spindle of wagon and buggy axles to retain the wheels in position thereon.

What I claim is:

In combination, a bolt and a nut thereon, said nut having an opening extending therethrough and communicating with the bore of the same, a housing removably secured in said opening, a locking pin disposed in said housing, a socket in said bolt normally adapted to receive the locking pin, a spring disposed between the end of said pin and said housing, a stud secured in said nut, a releasing lever loosely mounted upon said stud, said lever extending through the slot in said housing and connected to said locking pin to operate the same, the lower end of said lever being longitudinally extended in parallel relation to the nut, and a cotter pin extending through the upper end of said stud to secure said lever thereon.

In testimony whereof I affix my signature, in presence of two witnesses.

CHARLES A. EVANS.

Witnesses:
 WILL RUDELL,
 GEO. W. VAWTERS.